April 3, 1962 F. N. SCHWEND 3,028,080
DATA TRANSLATING AND REGISTERING SYSTEM
Filed Oct. 6, 1958 3 Sheets-Sheet 1

April 3, 1962 F. N. SCHWEND 3,028,080

DATA TRANSLATING AND REGISTERING SYSTEM

Filed Oct. 6, 1958

3 Sheets-Sheet 3

United States Patent Office 3,028,080

Patented Apr. 3, 1962

3,028,080
DATA TRANSLATING AND REGISTERING SYSTEM

Fred N. Schwend, El Monte, Calif., assignor to Clary Corporation, San Gabriel, Calif., a corporation of California Filed Oct. 6, 1958, Ser. No. 765,418
10 Claims. (Cl. 235—61.6)

This invention relates to combined registering and translating equipment for translating information from a combinational unit code into a corresponding single unit code, such as is found in the decimal system.

Information is often registered, stored, and transmitted in a combinational unit code, such as found in the binary and binary coded decimal systems, because it generally involves fewer holes in the case of perforated record cards or tape, less total area in the case of magnetically recorded information, less components in the case of an electronic digital registering apparatus, etc.

However, since numerical data is generally represented and understood in the decimal system, i.e. in a single unit code, it is desirable to translate such non-decimal data into decimal data during recording or otherwise registering such information so that the values may be more easily comprehended.

Accordingly, a principal object of the present invention is to provide a relatively simple and economically manufactured data registering apparatus for translating and registering information in a combinational unit code into a single unit code.

Another object is to provide a combined data translating and registering apparatus in which no extra time is required for translating the information from a combinational unit code into a single unit code.

Another object is to provide a relatively simple combined data translating and registering apparatus for sensing cards or other record medium which are perforated according to a combinational unit code.

The manner in which the above and other objects of the invention are accomplished will be readily understood on reference to the following specification when read in conjunction with the accompanying drawings, wherein.

Figures 1, 2, 3:
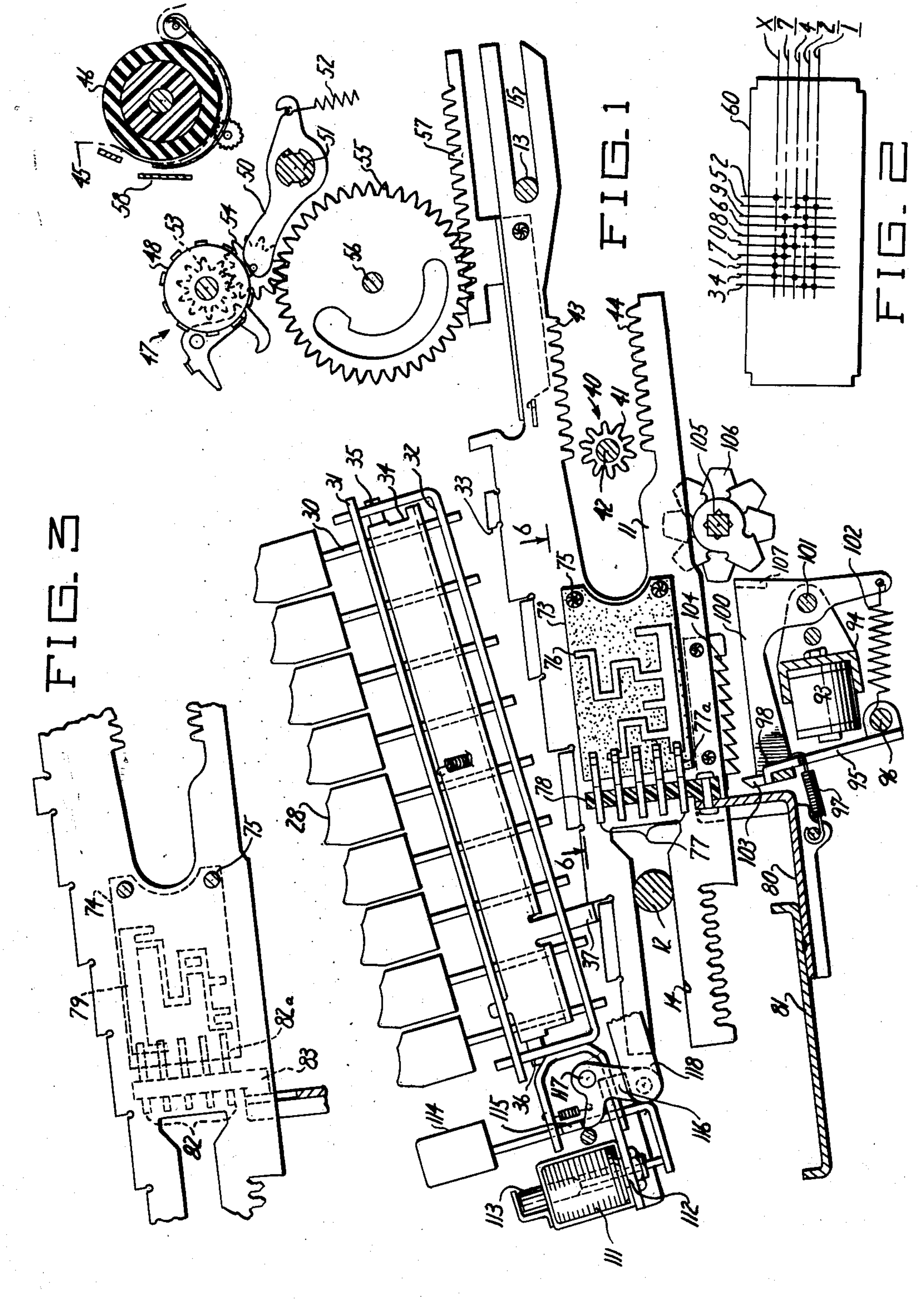
FIG. 1 is a longitudinal sectional view through a recording machine embodying a preferred form of the present invention.
FIG. 2 is a plan view of a perforated tag which is perforated in accordance with a two-of-five combinational code, and which is effective to be sensed by the form of the invention shown in FIGS. 1, 3 and 4.
FIG. 3 is a side view of part of one of the differential actuator racks with one of the contact plates removed.

The machine to which the present invention is applied is basically similar to that found in the well-known Clary adding machine disclosed and claimed in the R. E. Boyden Patent No. 2,583,810, issued on January 29, 1952. The accumulator mechanism of this machine is disclosed and claimed in the E. P. Drake Patent No. 2,472,696, issued on June 7, 1949.

Since the basic structure of the machine is disclosed in the above patents, only those portions thereof which relate to the present invention or which have been modified to accommodate the present invention will be described in detail herein. However, it is to be understood that the invention is not limited to the particular machine disclosed.

The machine includes a series of denominationally arranged racks 11 which are supported for independent fore and aft movements by transversely extending shafts 12 and 13, embraced by guide slots 14 and 15, respectively, in each of the racks. The shaft 13 is stationary, but the shaft 12 is moved fore and aft of the machine once during each machine cycle and is yieldably connected (in a manner not shown) to the various racks 11 whereby to yieldably advance the same to the left in FIG. 1 and to thereafter return them to their illustrated home positions.

The machine is driven by an electric motor (not shown) through a cyclically operable clutch, generally indicated at 16 (FIG. 4), the driven side of which is connected to a main drive shaft 17 which is effective (through means not shown) to advance and retract the shaft 12. The clutch is controlled by a clutch dog 18 fulcrumed at 19 and urged clockwise by a spring 20 into its illustrated position wherein it normally maintains the clutch in a disengaged position.

Means are provided for actuating the clutch dog to cause engagement of the clutch. For this purpose, a clutch control bar 21 is provided having elongated slots 22 embracing frame pins 23. The bar 21 is connected through a lever 24 fulcrumed at 25 to the plunger 26 of a solenoid 27. Upon energization of the solenoid, the clutch control bar 21 will be moved to the left which, through a hook 28, rocks the clutch dog 18 counterclockwise to effect engagement of the clutch 16.

The racks 11 may be operated under control of a manually set keyboard, if desired, and for this purpose, a bank of nine amount keys 28, ranging in digital values from "1" to "9" is located directly above each rack. Each of the keys comprises a key stem 30 slideably mounted in aligned slots formed in a top plate 31 and a bottom plate 32 comprising a keyboard frame.

The bottoms of the key stems cooperate with spaced shoulders 33 formed along the upper edges of the aligned racks 11 to differentially limit the forward advance of each rack to a numerical position corresponding to the value of a depressed key in the associated bank.

The various keys are normally held in their upper illustrated positions by suitable spring means (not shown) and means are further provided for locking any key in depressed position and for releasing any other previously depressed key in the same bank. For this purpose, each key stem 30 has a cam lobe (not shown) formed on one edge thereof and arranged so that when the key is depressed, the lobe engages a locking bail 34 pivoted at 35 and 36 to upstanding walls of the keyboard frame. Each locking bail 34 is spring pressed toward the key stems in the associated bank and as a key is depressed, the cam lobe will rock the bail 34 outwardly. As the lobe passes below the bail, the latter will retract to a position wherein it latches the key depressed.

A zero block 37 extends downwardly from each locking bail 34 and, when no key in a corresponding bank is depressed, the block will be positioned directly in front of one of the shoulders 33 to prevent substantial forward movement of the associated rack. However, when any key is depressed and latched down, the locking bail 34 will be held outwardly sufficient to retain its associated zero block out of the path of the aligned rack.

*Accumulator*

The machine embodies an accumulator, generally indicated at 40, comprising a series of denominationally arranged gears 41 independently and rotatably mounted on an accumulator shaft 42. The accumulator is normally maintained in its neutral position shown in FIG. 1 but is raised or lowered (by means not shown) to mesh the accumulator gears with upper or lower rack gear sections 43 and 44, respectively, on the various racks 11, depending upon the type of operation to be performed. During normal entry operations, the accumulator is raised or lowered into mesh with the associated rack gear section at the start of a machine cycle and before the racks are advanced to the left. Thereafter, and before the racks are returned from advanced positions, the accumulator is returned to its illustrated neutral position.

Each accumulator gear nominally registers an amount corresponding to the number of increments through which the rack is advanced during a cycle. Tens transfer mechanism (not shown) is provided to advance a higher order accumulator gear one increment when the next lower order gear has completed one revolution.

*Printer*

The various values represented by the numerical positions to which the racks 11 are advanced are printed on a paper tape 45 which is fed around a platen 46 to a printing station where a value represented by the positioning of the racks is printed.

The printer, generally indicated at 47, comprises a series of numeral printing wheels 48, each operatively entrained with an associated one of the racks 11. Each printer wheel has spaced around its periphery, a series of digit type ranging in value from "0" to "9." Each printer wheel is rotatably mounted on a separate printing arm 50 which is loosely keyed on a printer control shaft 51 and is urged clockwise by a tension spring 52. A gear 53 integral with each printer wheel meshes with a gear 54 also rotatably mounted on the associated arm 50. Except during printing operations, the various arms 50 are held by the shaft 51 in their illustrated positions wherein the gears 54 mesh with idlers 55. The latter are independently and rotatably mounted on a support shaft 56 and continuously meshed with offset rack sections 57 carried by the various racks.

After the various racks have been advanced to their digitized positions and before their return, the printer control shaft 51 is rocked lockwise, by means not shown, permitting the springs 52 to rock the arms clockwise, carrying the type wheels 48 into contact with a printing ribbon 58 to effect printing. The shaft 51 is then returned to its original position to return the gears 54 into mesh with the idlers 55 before the racks 11 are returned. Therefore, the type wheels 48 register amounts corresponding to the numerical positions to which the racks 11 advance.

*Tag Reading Controls*

According to the present invention, instrumentalities are provided to sense a perforated tag 60 (FIG. 2) of cardboard, plastic or other insulating material. The latter is coded according to the "1," "2," "4" and "7" combinational code which is modified to include an "*x*" row of perforations so that each digit representation will include two holes. That is, in those digit representations, such as "1," "2," "4" and "7" where a digit is represented normally by a single hole, an "*x*" hole is punched, whereas in all other digit representations requiring a combination of two holes to represent the digit, the "*x*" hole is not punched.

In reading a punched tag, the latter is placed on a table 61 (FIG. 4) of insulating material having suitable locating means (not shown) provided to locate the tag in proper position relative to a field of contact pins 62 embedded therein.

A sensing head 63 is slideably mounted on posts 64 embedded in the table 61 and is normally spring held in its upper illustrated position by compression springs 65. Sensing pins 66 are slideably mounted in the head and are urged downwardly into their positions shown by compression springs 67, each engaging a collar 68 suitably attached to its associated pin. Upon depression of a key 70, the latter will force the sensing head 63 downwardly causing the sensing pins 66 aligned with perforations in the tag to pass therethrough and electrically contact aligned ones of the contact pins 62, thereby completing a circuit from a source 71 of minus potential, through the head 63 and pins 62 to certain of a series of five lines 72 leading to a pair of brush units, to be described presently, associated with a rack in a corresponding denominational order of the machine.

As shown particularly in FIGS. 1 and 3, each rack 11 has a pair of contact members or plates 73 and 74 of insulating material attached on opposite sides thereof by rivets 75. The contact plates 73 and 74 have contact conductors 76 and 79, respectively, suitably bonded thereon.

A set of brushes 77 are located adjacent the contact plate 73 and are supported in wiping engagement with the plate by a post 78 of insulating material which is supported by a bracket 80 attached to a cross brace 81 forming part of the machine framework. Likewise, a set of brushes 82 is supported by a post 83 in wiping contact with the contact plates 74.

Conductor 76 (FIGS. 1 and 4) is so formed that the lower brush 77*a* will be in continual wiping contact therewith. The latter brush is connected by line 85 and resistor 86 to the base of a PNP type transistor 87. Likewise, the upper brush 82*a* is in continual wiping engagement with its associated conductor 79 and is connected by line 90 and resistor 91 of the same ohmic value as resistor 86, to the base of transistor 87.

The emitter-collector circuit of the transistor is connected in circuit with a source 92 of D.C. current and an electromagnet 93 located in an associated denominational order of the machine.

Referring to FIG. 1, the magnet 93 is suitably secured to a channel member 94 which extends across the machine and is supported by the machine framework. The magnet is effective, when energized, to operate an armature 95 pivotally supported by a cross rod 96 and normally urged by a tension spring 97 into a position wherein a latching tip 98 thereon latches a rack arresting pawl 100 in its illustrated position. The pawl 100 is pivoted at 101 and urged clockwise by a spring 102 tensioned between the rod 96 and the tail on the pawl. When the armature 95 is actuated by its magnet, it will release the pawl 100, permitting the same to be swung upwardly by its spring 102 to cause a latching tooth 103 thereon to engage one of a series of rack teeth 104 integral with the associated rack 11. The teeth 104 are spaced apart equal to each increment of movement of the rack so as to permit arresting of the rack by the pawl in any of its numerical positions through which it advances during the first half of a machine cycle.

During the second half of a machine cycle, and while the racks 11 are being returned to their home positions, a tens transfer shaft 105 is rotated, as disclosed in the aforementioned Drake patent, to effect a tens transfer operation in those denominational orders where such operation is necessitated. The shaft 105 carries a series of transfer cams 106 located in helical relation with each other. During such rotation of the transfer shaft, the cams 106 engage ears 107 on the arresting pawls 100 to return the same counterclockwise into positions where they are again latched by the latching armatures 95.

Referring again to FIG. 4, it will be noted that the conductors 76 and 79 have peculiarly shaped extensions extending into the path of the various brushes associated therewith so as to effect electrical contact with different ones of the brushes in each numerical position through which the rack passes. Also, it will be noted that in each position of the rack, a contact portion of one conductor extension on each contact member will engage one brush, and one only.

The configuration of the conductors 76 and 79 is dependent on the particular code adopted and on the arrangement of the sets of brushes relative to the conductors.

Figure 4:
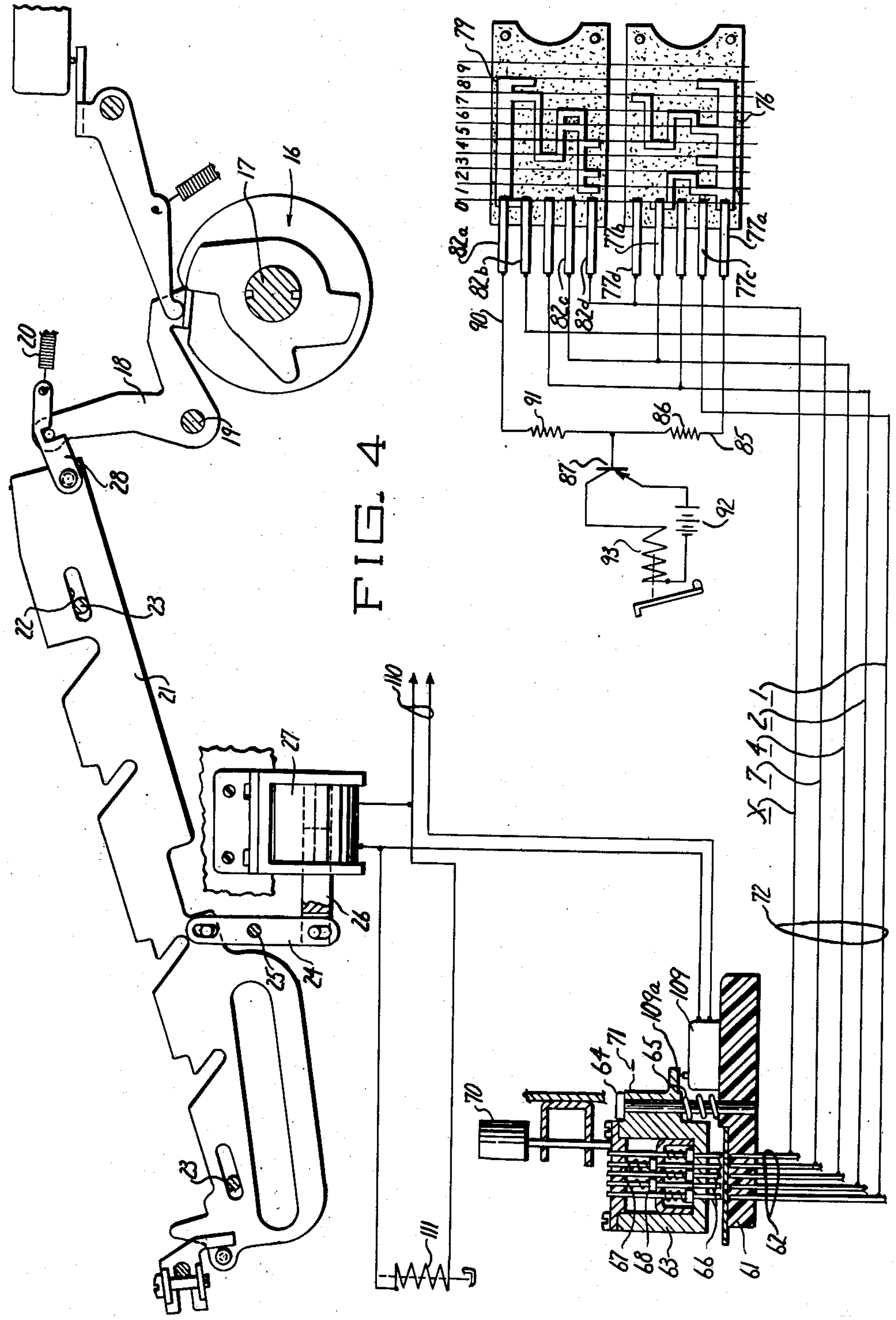
FIG. 4 is a combined side view of the machine clutch controls and a schematic wiring diagram of one order of the machine.

For example, a decimal zero is represented by holes located in the "4" and "7" rows in the tag 60 (FIG. 2). Accordingly, when a "0" representation is being sensed in a particular denominational order of the tag, the four and seven lines 72 will be biased negatively and the other lines will be neutral. It will be seen that when the rack is in its zero position, as depicted in FIG. 4, brushes **77*b* and 82*b*, connected to the "4" and "7" lines 72, are in wiping contact with contact portions of the conductors 76 and 79. Therefore, a negative potential of sufficient value will be applied through resistors 86 and 91 to the base of transistor 87 to allow the emitter-collector current to flow, thereby energizing the magnet 93. The rack arresting pawl 100** will thus block the rack from advancing from its "0" position.

Application of negative potential through one only of the resistors 86 and 91 will be insufficient to cause emitter-collector current to flow. Therefore, considering an example in which a "5" representation has been sensed, the "5" and "1" lines 72 will be biased negatively and the others will be neutral. Accordingly, it is only when the rack has advanced to its "5" position that brushes **77*c* and 82*c* in both sets, will concurrently complete circuits through respective conductors 76 and 79 to the "4" and "1" lines 72** to effect conduction of the transistor and arresting of the rack.

It will be seen by inspection of the shapes of the conductors 76 and 79 relative to the different brushes and lines 72 that the racks will be arrested in any of a plurality of different positions depending upon the location of the coded holes in the corresponding denominational order of the tag. Further, it will be noted that, in order to convert from a combinational unit code to a single unit code, negative potentials effective to cause conduction of the emitter-collector circuit of the transistor 87 must be derived jointly through the two conductors 76 and 79 from two separate ones of the lines 72. Otherwise, current derived solely from any one line 72 to cause conduction of the transistor would, in some cases, prematurely energize the magnet 93.

Means are provided for causing operation of the machine and release of the various zero blocks 37 as an incident to sensing of the tag. For this purpose, a normally open switch 109 is located on the table 61 and is closed by an extension **109*a* on the sensing head 63 when the latter is lowered into sensing position by depression of the key 70. The switch 109 is connected in series with the aforementioned clutch control solenoid 27 across a power supply line 110. Connected in parallel with the solenoid 27 is a clear key solenoid 111 (see also FIG. 1). The latter is mounted on a bracket 112 suitably attached to the key board frame and its armature 113 overlies a foot formed on the stem of a clear key 114 which is slideably mounted in aligned slots in the bracket 112. The clear key has a shoulder 115 thereon which overlies one arm of the bell crank 116 fulcrumed at 117 and connected by a link 118 to additional linkage, not shown, whereby depression of the clear key will be effective to rock the various key locking bails 34 to release the zero blocks 37** from blocking relation with their racks.

Accordingly, when the sensing head 63 is lowered to sense a tag placed thereunder, the switch 109 is closed to energize the clutch controlled solenoid 27, thereby initiating operation of the machine. Simultaneously, the clear key solenoid 111 is energized to release the zero blocks 37 so that the racks may be advanced under control of the tag.

Figure 7:
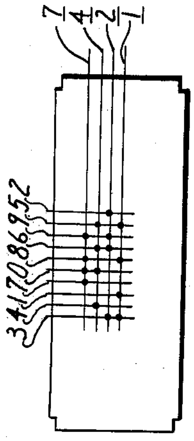
FIG. 7 is a plan view of a tag perforated in accordance with a combinational code readable by the circuitry shown in FIG. 5.
Figure 6:
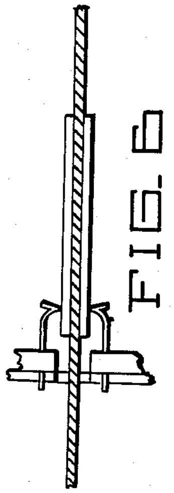
FIG. 6 is a sectional plan view taken along the line 6—6 of FIG. 1.
Figure 5:
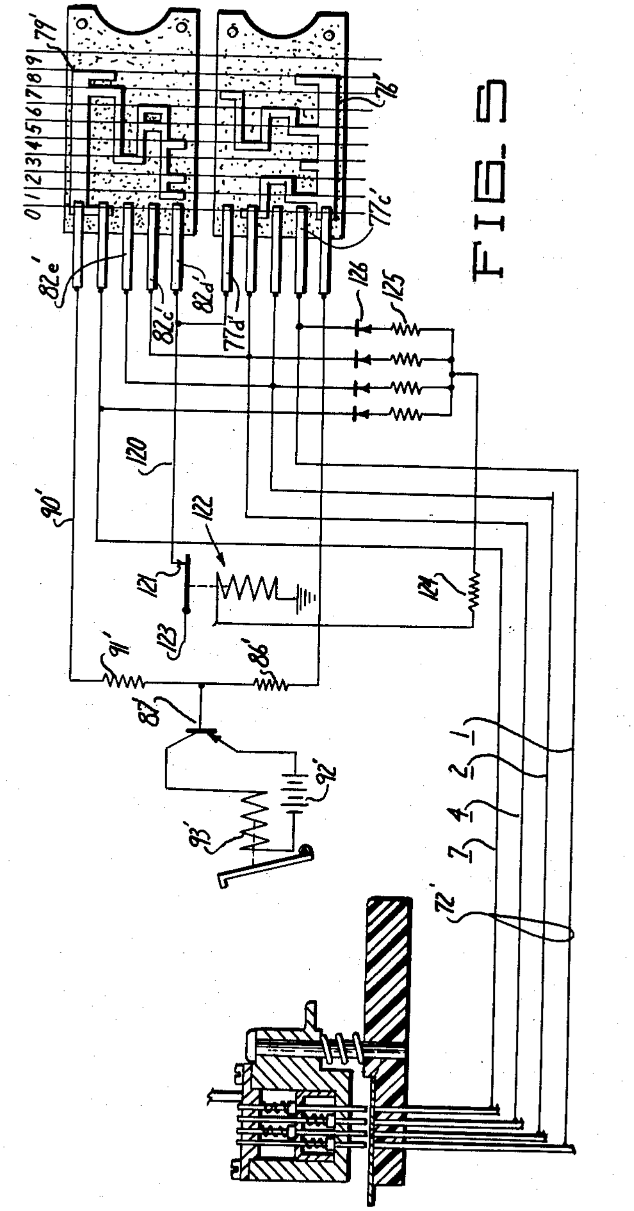
FIG. 5 is a schematic wiring diagram of a modified form of the invention.

FIG. 5 illustrates a modified form of the invention in which elements similar to those found in FIGS. 1 and 4 are identified with similar reference numerals to which prime marks are applied. This construction is capable of reading a punched tag of the type shown in FIG. 7 wherein only four rows of holes are provided, there being no additional row of "*x*" holes for those cases where only one hole in the tag represents a decimal digit, such as occurs with the digits "1," "2," "4," and "7."

In this construction the "*x*" line of the group of lines 72′ is omitted and the brushes **77*d*′ and 82*d*′**, whose counterparts in FIG. 4 were connected to the "*x*," line, are connected, instead, through a line 120 and normally closed contacts 121 of a relay 122 to a source 123 of negative potential. The coil of the relay 122 is grounded at one end and connected at its other end through a resistor 124 to a group of parallel connected resistors 125 and diodes 126, which are connected to different ones of the "1," "2," "4," and "7" lines of the group 72′.

The values of the resistors 124 and 125 are so chosen that application of a negative potential to one only of the lines "1," "2," "4," and "7," as occurs in the corresponding decimal representation, will be insufficient to energize the relay. Therefore, for example, in the case where a "1" representation is sensed, the "1" line only is biased negative. When the rack reaches its "1" position, a contact will be established through brush **77*c*′ to the base of transistor 87′. A second circuit will be completed through brush 82*d*′ from the negative source 123 and through resistor 91′ to supply sufficient negative potential to the base of the transistor 87 to cause conduction in its emitter-collector circuit so as to energize the electromagnet 93′**.

However, in the case, for example, where the "3" representation on the tag is sensed, negative potential will be applied concurrently to the "1" and "2" lines. Thus, sufficient negative potential will be applied to the relay 122 to energize the same and break the negative potential supply to the brushes **77*d*′ and 82*d*′. In such case, the rack will advance to its "3" position wherein contact will be made by brushes 77*c*′ and 82*e*′ with their respective conductors 76′ and 79′ to apply sufficient negative potential to the base of transistor 87′ to enable sufficient current to pass therethrough to energize the associated electromagnet 93′**, resulting in arresting of the corresponding rack.

Although I have described my invention in detail in its preferred embodiment and have therefore utilized certain specific terms and languages, it is to be understood that the present disclosure is illustrative rather than restrictive and that changes and modifications may be made without departing from the spirit or scope of the claims appended hereto. For example, the term "registering device" is intended to represent a printing device, accumulator device, or the like.

Having thus described the invention, what I desire to secure by United States Letters Patent is:

1. In a registering system for an apparatus having a plurality of terminals which indicate different decimal digits by combinations of distinctive potentials on different ones of said terminals, respectively, a registering device differentially settable to different digit registering positions, a differential actuator for actuating said registering device, and means for differentially arresting said actuator, the combination comprising two matrices of contacts arranged according to different possible combinations of distinctive potentials applied to said terminals, the contacts in each of said matrices being interconnected, a set of brushes arranged in continual wiping relation with one of said matrices, a set of brushes arranged in continual wiping relation with the other of said matrices, said actuator being effective to cause relative wiping movement between said brushes and said contacts; circuits connecting said terminals with different ones of said brushes, and means responsive only to concurrent application of a distinctive potential to both of said matrices to actuate said arresting means.

2. In a registering system for an apparatus having a plurality of terminals which indicate different digits by combinations of distinctive potentials on different ones of said terminals, respectively, a registering device differentially settable to different digit registering positions, a differential actuator for actuating said registering device, and an electrically controlled actuator arresting device, the combination comprising a plurality of contacts arranged according to different possible combinations of distinctive potentials applied to said terminals, brushes arranged in continual wiping relation with different ones of said contacts, said actuator being effective to cause relative wiping movement between said brushes and said contacts; circuits connecting said terminals with different ones of said brushes, a first circuit connecting certain of said contacts to said arresting device, and a second control circuit connecting certain others of said contacts to said arresting device, said arresting device requiring a distinctive potential applied thereto by both of said control circuits to arrest said actuator.

3. In a registering system for an apparatus having a plurality of terminals which indicate different digits by combinations of distinctive potentials on different ones of said terminals, respectively, a registering device differentially settable to different digit registering positions, a differential actuator for actuating said registering device, and an electrically controlled actuator arresting device having an input circuit, the combination comprising a plurality of contacts arranged according to different possible combinations of distinctive potentials applied to said terminals, brushes arranged in continual wiping relation with different ones of said contacts, said actuator being effective to cause relative wiping movement between said brushes and said contacts; circuits connecting said terminals with different ones of said brushes, a first control circuit connecting certain of said contacts to said input circuit, and a second control device connecting certain others of said contacts to said input circuit, the potentials derived from each of said control circuits individually being insufficient to cause operation of said arresting device and the potentials derived from both of said control circuits collectively being effective to cause operation of said arresting device.

4. In a registering system for an apparatus having a plurality of terminals which indicate different digits by combinations of distinctive potentials on different ones of said terminals, respectively, a registering device differentially settable to different digit registering positions, a differential actuator for said registering device, an electrically controlled actuator arresting device, and a plurality of contacts carried by said actuator, said contacts being arranged according to different possible combinations of distinctive potentials applied to said terminals, the combination comprising a first set of stationary brushes associated in wiping contact with certain only of said contacts, a second set of stationary brushes associated in wiping contact with certain others of said contacts, circuits connecting said terminals with different ones of said brushes, a first control circuit connecting certain of said contacts to said arresting device, and a second control circuit connecting certain others of said contacts to said arresting device, said actuator arresting device requiring a distinctive potential applied thereto by both of said control circuits to arrest said actuator.

5. In a registering system for an apparatus having a plurality of terminals which indicate different decimal digits by combinations of distinctive potentials on different ones of said terminals, respectively, a registering device differentially settable to different digit registering positions, a differential actuator for said registering device, and means for arresting said actuator, the combination comprising two matrices of contacts carried by said actuator, said contacts being arranged according to different possible combinations of distinctive potentials applied to said terminals, the contacts of each of said matrices being interconnected, a stationary set of brushes associated in wiping contact with one of said matrices, a stationary set of brushes associated in wiping contact with the other of said matrices, circuits connecting said terminals with different ones of said brushes, and means responsive only to concurrent application of a distinctive potential to both of said matrices to actuate said arresting means.

6. In a registering system for an apparatus having a plurality of terminals which indicate different decimal digits by combinations of distinctive potentials on different ones of said terminals, respectively, a registering device differentially settable to different digit registering positions, a differential actuator for actuating said registering device, and an electrically controlled actuator arresting device, the combination comprising two matrices of contacts arranged according to different possible combinations of distinctive potentials applied to said terminals, a set of brushes in wiping relation with one of said matrices, a set of brushes in wiping relation with the other of said matrices, said actuator being effective to cause relative wiping movement between said brushes and said contacts; circuits connecting said terminals to different ones of said brushes, a first control circuit connecting one of said matrices of contacts to said arresting device, and a second control circuit connecting the other of said matrices of contacts to said arresting device, said arresting device requiring a distinctive potential concurrently applied thereto by both of said control circuits to arrest said actuator.

7. In a registering system for an apparatus having a plurality of terminals which indicate different numerical digits by combinations of distinctive electrical signals on different ones of said terminals, respectively, a registering device differentially settable to different digit registering positions, a differential actuator for actuating said device, and an electrically controlled actuator arresting device, the combination comprising two matrices of contacts carried by said actuator and arranged according to different possible combinations of distinctive electrical signals applied to said terminals, a set of stationary brushes in wiping relation with one of said matrices, a set of stationary brushes in wiping relation with the other of said matrices, circuits connecting said terminals to different ones of said brushes, a first control circuit connecting the contacts of one of said matrices to said arresting device, and a second control circuit connecting the contacts of the other of said matrices to said arresting device, said arresting device being effective only upon application of distinctive electric signals applied thereto by both of said control circuits.

8. In a registering system for an apparatus having a plurality of terminals which indicate different digits by combinations of distinctive electrical signals on different ones of said terminals, respectively, a registering device differentially settable to different digit registering positions, a differential actuator for actuating said registering device, and means for arresting said actuator, the combination comprising two matrices of contacts arranged according to different possible combinations of distinctive electrical signals applied to said terminals, a set of brushes in wiping relation with one of said matrices, a set of brushes in wiping relation with the other of said matrices, said actuator being effective to cause relative wiping movement between said brushes and said contacts; circuits connecting said terminals with different ones of said brushes, and means responsive to concomitant application of a distinctive electrical signal to a contact in each of said matrices for arresting said actuator.

9. In a recording device for an apparatus having a plurality of terminals which indicate different digits by combinations of distinctive potentials on different ones of said terminals, respectively, a registering device differentially settable to different digit registering positions, a differential actuator for actuating said registering device, means for advancing said actuator, and a device for arresting said actuator, the combination comprising a pair of contact members, a set of brushes in wiping relation with one of said contact members, a set of brushes in wiping relation with the other of said contact members, said actuator being effective to cause relative wiping movement between said brushes and respective ones of said contact members; circuits connecting said terminals with different ones of said brushes, rows of contacts on each of said contact members, said contacts being arranged in said rows according to different possible combinations of distinctive potentials applied to said terminals, said rows being located in the paths of respective ones of said brushes, and means responsive only to concurrent application of distinctive potentials to contacts on both of said contact members for actuating said arresting device.

10. In a system for sensing and registering an amount registered by a record member perforated according to a two-of-five combinational unit code, said system having a registering device differentially settable to different digit registering positions, a differential actuator for said registering device, and means for arresting said actuator, the combination comprising two matrices of contacts arranged according to different possible combinations of said perforations, the contacts in each of said matrices being interconnected, a set of brushes associated with one of said matrices, a set of brushes associated with the other of said matrices, said actuator being effective to cause relative wiping movement between said brushes and said contacts; means for sensing said perforations and for applying distinctive potentials to corresponding ones of said brushes, and means responsive only to concurrent application of a distinctive potential to both of said matrices to actuate said arresting means.

References Cited in the file of this patent

UNITED STATES PATENTS

| | | |
|---|---|---|
| 2,649,557 | Ransom | Aug. 18, 1953 |
| 2,757,862 | Boyden et al. | Aug. 7, 1956 |
| 2,767,907 | Schwend | Oct. 23, 1956 |
| 2,783,939 | Boyden et al. | Mar. 5, 1957 |